United States Patent [19]

Lappi

[11] Patent Number: 5,308,647
[45] Date of Patent: May 3, 1994

US005308647A

[54] LIQUID SPRAY MASKING COMPOSITION AND METHOD

[75] Inventor: Larry R. Lappi, Stillwater, Minn.

[73] Assignee: Minnesota Mining and Manufacturing Company, St. Paul, Minn.

[21] Appl. No.: 959,563

[22] Filed: Oct. 13, 1992

[51] Int. Cl.$^5$ ............................................. B05D 1/32
[52] U.S. Cl. ................................. 427/154; 427/156; 427/259; 427/282; 427/287; 427/421; 106/2; 106/189; 106/208; 106/311; 524/379; 524/557; 252/DIG. 8
[58] Field of Search .................. 106/2, 189, 208, 311; 427/154, 156, 282, 287, 421, 259; 524/379, 557; 252/DIG. 8

[56] References Cited

U.S. PATENT DOCUMENTS

| | | | |
|---|---|---|---|
| 2,835,603 | 5/1958 | Swinehart et al. | 106/189 |
| 3,114,650 | 12/1963 | Oppenheim et al. | 117/6 |
| 3,124,474 | 3/1964 | Beaver et al. | 106/189 |
| 4,347,266 | 8/1982 | Norman et al. | 427/154 |
| 4,428,984 | 1/1984 | Shimizu et al. | 427/220 |
| 4,525,501 | 6/1985 | Norman et al. | 524/28 |
| 4,548,967 | 10/1985 | Brown et al. | 427/154 |
| 4,748,049 | 5/1988 | Charles et al. | 427/154 |
| 4,867,792 | 9/1989 | Ronlan | 106/189 |
| 4,895,599 | 1/1990 | Wallace | 106/189 |
| 4,911,218 | 3/1990 | Patitsas | 152/525 |
| 5,028,350 | 7/1991 | Marsek | 252/88 |
| 5,049,609 | 9/1991 | Patitsas | 524/386 |
| 5,058,648 | 10/1991 | Kansupeda | 152/524 |
| 5,104,711 | 4/1992 | Marsek | 428/78 |
| 5,143,949 | 9/1992 | Grogan et al. | 427/154 |
| 5,186,978 | 2/1993 | Woodhall et al. | 106/2 |
| 5,201,946 | 4/1993 | Marsek | 106/2 |

FOREIGN PATENT DOCUMENTS

| | | |
|---|---|---|
| 750967 | 1/1967 | Canada . |
| 0405341 | 1/1991 | European Pat. Off. . |
| 2728464A1 | 1/1988 | Fed. Rep. of Germany . |
| 53-042227 | 4/1978 | Japan ............................. 427/154 |
| 4-313366 | 11/1992 | Japan ............................. 427/154 |
| WO92/08555 | 5/1992 | PCT Int'l Appl. . |
| 1604562 | 12/1981 | United Kingdom . |

*Primary Examiner*—Anthony Green
*Attorney, Agent, or Firm*—Gary L. Griswold; Walter N. Kirn; Ramon R. Hoch

[57] ABSTRACT

An improved liquid spray masking composition including an effective amount of a non-volatile polyhydroxy component is provided. The preferred polyhydroxy components comprise polyglycerols, especially triglycerols or larger polyglycerols. The presence of such materials in masking compositions improves performance of the compositions with respect to inhibition of high temperature swelling, blistering or spotting of the painted surface to which it is applied.

26 Claims, No Drawings

LIQUID SPRAY MASKING COMPOSITION AND METHOD

FIELD OF THE INVENTION

The present invention relates to a composition for use in masking a painted surface. For example, the invention may be utilized to apply a mask to an undamaged painted surface of a vehicle (or to a glass, metal or other surface of a vehicle) to protect that portion of the vehicle from paint overspray during body shop painting of an adjacent (for example repaired) portion of the same vehicle. The invention also concerns methods for improving such compositions and for improved use of such compositions.

BACKGROUND OF THE INVENTION

While the present invention may be applied in a variety of manners, it is foreseen that it is particularly well adapted for applications concerning vehicle refinishing. Portions adjacent to the area to be painted are generally masked to inhibit paint overspray from reaching and adhering to areas not intended to be painted.

One typical masking or protective procedure involves applying a paper mask or plastic mask over the area not to be painted. Such masks can be applied and secured by tape or similar means. They are generally stripped from the vehicle and discarded, after use. However, neither of these methods is fully acceptable at least because air currents can cause the paper or plastic to flutter and allow overspray to swirl behind the paper or plastic, or to tear and expose areas to the overspray.

Water-washable liquid masking compositions have been developed. Examples of such compositions are disclosed in U.S. Pat. Nos. 5,104,711; 5,028,350; 4,525,501; and 4,347,266. The system described in the '711 patent provides an example of such systems. According to the disclosure, the liquid masking composition comprises: solvent (typically water), a polyhydroxy liquid carrier (typically glycerol), which aids in dispersion of thickener and surfactant during formulation of the composition and which also operates as a plasticizer in the coating, a thickener or film former (typically xanthan gum), which provides desired rheological properties and which forms a film on the coated surface and surfactant. The composition is prepared by mixing together appropriate amounts of the various components. A portion of a vehicle to be masked is spray-coated (typically and preferably with an atomizing spray gun) with the liquid masking composition. As the masking solution spreads, it will form a continuous mask, i.e., film or coating. A portion of the vehicle (not coated with film) to be finished is then coated with automotive primer, paint, or enamel, with any overspray that occurs typically landing on the masking film. After painting is complete and the paint film is dry, the masking film is readily removed with a washing solution, typically water or soapy water.

The present invention concerns improvements to liquid masking solutions. The improvements concern means by which product performance is enhanced due to reduction in likelihood of damage to the vehicle paint coating from the masking solution or film. The term "paint coating" or variants thereof as used herein in this context is meant to refer to coatings comprising any of a variety of materials including for example, acrylic enamels, acrylic lacquers, polyurethanes, metal flake paints and other typical vehicle finishes.

SUMMARY OF THE INVENTION

According to the present invention there is provided a masking composition for application to painted or unpainted surfaces (especially painted metal or plastic surfaces, or an unpainted surface such as a glass surface found on the exterior of cars) to protect same, for example, from a paint overspray. The masking compositions may be used, for example, to protect a painted portion of a vehicle from primer and paint overspray during priming and painting of repaired portions of the vehicle.

Masking compositions according to the present invention generally include an effective amount and preferably at least 1% by weight of a polyhydroxy organic component having a volatility no greater than that of diglycerol. Preferably, the polyhydroxy component is of the formula:

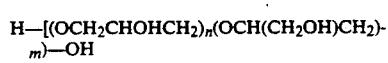

Wherein n and m are each integers between 0 and 30, inclusive, with the requirement than m+n be at least 2. Preferably, m+n is at least 3 and no more than 10.

Preferred such materials comprise triglycerols and tetraglycerols, or mixtures thereof with higher homologs.

The masking compositions will generally include therein surfactant, liquid carrier and thickener (film former). They may also include low molecular weight or volatile polyhydroxy compounds such as glycerol.

Also according to the present invention a method of inhibiting swelling, spot formation, and blistering by a masking composition applied to a painted surface of the vehicle and then heated to a temperature of at least 110° C. is provided. The method comprises a step of including within the masking composition an effective amount of the polyhydroxy compound.

DETAILED DESCRIPTION OF THE INVENTION

A. Problems with Conventional Masking Compositions and Their Use

While there have been some limited successes in providing effective protection with conventional masking compositions, some problems have been observed. In particular, in some applications when the masking film is washed off, a residue is observed to remain on the painted, previously masked, surface. While such residue can take a variety of forms, it is often observed to be a plurality of light-colored spots of residue. The presence of such residue on surfaces previously masked with liquid masking compositions is generally referred to as "spotting."

Problems with spotting are often associated with dissolved solids in the water used in the coating and counterions of anionic surfactants used to promote wetting and levelling of the coating. Spotting problems have been observed to be reduced through the use of deionized water and nonionic surfactants in masking compositions.

Minimizing presence of the problem ionic components or reducing their ability to form precipitates has had some benefit. However, spotting has continued to be a problem, even when compositions involving improved surfactants, deionized water, and in some instances various sequestering agents are utilized.

It has been observed that problem spotting does not take place with equal frequency in all types of applications, to all types and colors of vehicles, in all environments. In particular, it is observed that problem spotting appears to be most persistent on dark-colored vehicles, although that observation may at least in part reflect the fact that spotting is much easier to detect when contrasted with a dark finish. Also, persistent problem spotting appears to be more likely to occur in warmer seasons or climates.

Upon close examination, it was observed that the persistent problem "spotting" referenced in the previous paragraph was more than merely the generation of a surface deposit on the vehicle paint. Upon very close examination, it appeared that the spotting had a component which reflected destruction of, or damage to, the paint on the vehicle.

In part because the spotting appears to be most persistent on dark cars treated in hotter environments, it could be theorized that the spotting is related to a surface temperature phenomena, with higher temperatures exacerbating the problem. In particular, vehicles, after having been coated with the masking solution, may be left out in the sun for a period of time to dry. Darker-colored vehicles will tend to absorb a greater amount of energy and become hotter. In fact, the surface temperature of a dark automobile can readily get to 80°–95° C., and some believe up to as high as 135° C., on especially hot, sunny days. Lighter-colored vehicles, of course, will not absorb as much thermal energy, and thus may not become anywhere near as hot.

Based on the above, it could be hypothesized that under exposure to substantial heat (about 80° C.) conventional masking compositions generate actual and permanent damage to the enamel or paint of a vehicle. After testing and evaluation, the hypothesis was confirmed. The damage appears as either blistering, swelling, spotting or some combination thereof. Such damage, which generally appears to concern relatively high-temperature conditions (surface temperature on the vehicle of at least 80° C.) and destruction of vehicle paint or enamel as opposed to mere deposition of ionic precipitate thereon, is referred to herein as "high-temperature damage," and when it concerns spotting it is referred to herein as "high-temperature spotting."

While the precise causes of high-temperature swelling, blistering and spotting are not known, during the investigations which led to the development of the present invention it was theorized that the phenomenon may concern penetration of the vehicle paint or enamel by components (especially surfactant(s) and/or plasticizer(s)) in the masking composition or resulting film under high-temperature conditions. While investigations were being conducted, it was observed that, when glycerol was applied to a painted surface simulating a vehicle paint coating, after exposure to a temperature of about 110°C blistering of the paint coating resulted. In addition, it was observed that when surfactants of a type commonly used in masking solutions, for example, were applied to a painted surface simulating a vehicle paint coating, after exposure to a temperature of about 110° C., blistering of the paint coating resulted. Such an investigation does not eliminate the possibility that other components in the masking composition are also responsible for high-temperature spotting observed in the field; however, the observation provided a point for initial investigation into inhibition of swelling, blistering, high-temperature spotting, and, ultimately, prevention.

B. Improved Coating Compositions

In general, a masking composition or masking film for use in protecting surfaces (for example painted or enamel coated surfaces or unpainted glass surfaces) such as vehicle surfaces from paint overspray is considered "improved" according to the present invention if its propensity to cause swelling, blistering or high-temperature spotting, i.e., damage at surface temperatures above about 80° C., is reduced. In general, improvement is observed by provision within the masking composition that is utilized to prepare the masking film, of an effective amount of a polyhydroxy component possessing certain preferred characteristics. The polyhydroxy component introduced into a masking composition for this purpose will in general be referred to herein as a "swelling, blistering or high-temperature spotting inhibitor." It is not meant by this characterization, however, to suggest that the component does not perform other functions in the coating composition and/or resulting film. Rather, what is meant is that the component does provide inhibition of swelling, blistering or high-temperature spotting; i.e. high-temperature paint destruction. By the term "effective amount" in this context it is meant that a sufficient amount of the additive is provided so that the composition exhibits a lower propensity for swelling, blistering or high-temperature spotting in the presence of the inhibitor than in its absence. The polyhydroxy component or "inhibitor" may comprise a single material or a mixture of materials, as indicated below.

In general, compositions according to the present invention, when prepared for application to a surface such as a vehicle surface as an overspray or masking film, include therein as general components: solvent (carrier); thickener/film-former component; surfactant; and, high-temperature swelling, blistering or spotting inhibitor. In addition, the compositions may include plasticizers in addition to the high-temperature swelling, blistering or spotting inhibitor. Such compositions may also include a variety of adjuvants.

Preferred compositions according to the present invention are masking compositions generally according to U.S. Pat. No. 5,104,711 improved by the presence therein of an effective amount of high-temperature spotting inhibitor, as described herein. The disclosure of U.S. Pat. No. 5,104,711 is incorporated herein by reference. Preferred masking solutions of the present invention are generally not very expensive to prepare, since they comprise relatively inexpensive components. In addition, they may include industrial versions of food or cosmetic grade ingredients, and thus may be formulated to be relatively safe and nontoxic.

1. The Solvent (Carrier)

The preferred solvent (or carrier) for compositions according to the present invention is water. However, in general any solvent or carrier may be utilized in which the remaining components of the composition are readily soluble or dispersible/emulsifiable and which possesses a sufficient volatility and coatability for the purposes intended.

Preferably, distilled or deionized water is used as a solvent, although tap water can be used in some instances. If water with significant ionic content is employed, it may be desirable to include in the composition a sequestering agent such as a tetrasodium salt of ethylenediaminetetraacetic acid (EDTA), sodium metaphosphate, aminopolycarboxylic acids, inorganic polyphosphates, polyacrylates, and organophosphorus compounds or mixtures thereof. Such sequestering agents serve as water softeners, chelating agents, or metal ion deactivators, thus inhibiting the formation of insoluble soap or scale. If the available tap water is sufficiently "soft," a sequestering agent may be unnecessary.

The amount of solvent carrier should be sufficient to dissolve (or carry) the remaining components and impart to the mixture of masking solution the desired spraying and spreading properties. The amount can vary depending on the types and amounts of the other ingredients in the solution, the type of application equipment, and the thickness of coating desired.

As a general guide the amount of carrier, especially if water, should be at least about 70 wt-%, preferably about 75-95 wt-%, based on the total masking solution weight. Lower amounts can be used if desired, particularly in concentrates intended to be diluted before use or if the composition is to be applied with equipment other than the preferred equipment identified herein. Wherein percentages of components by weight in a masking composition are meant to refer to the composition as it is applied to the vehicle or other surface to be coated. Modifications, especially with respect to water (solvent or carrier) content, will be appropriate for a commercial product if it is to be diluted before application or if it is to be applied with equipment other than the preferred equipment identified herein.

2. The Thickener or Film Former

The thickening component facilitates formation, leveling, and retention of the film on a vertical surface. Preferably it is a water-soluble film-forming material that imparts a nonbleeding character and sag resistance to the film.

In some instances, the thickener is preferably such that it also permits the film to remain in a tacky state after application (and solvent drying) in order to trap dust. Such instances are referred to herein as "wet" or "tacky" masks. In some applications dry masks will also be acceptable.

Preferred thickeners are polysaccharides, such as hydroxyethyl cellulose (for example, that available under the trade names "NATROSOL" from Aqualon Co., and "CELLOSIZE," available from Union Carbide Corp.), hydroxypropyl cellulose (for example, that available under the trade name "KLUCEL," from Aqualon Co.), hydroxypropyl methyl cellulose (for example, that available under the trade name "METHOCEL," available from Dow Chemical Co.), sodium carboxymethyl cellulose (for example, that available under the trade names "NATROSOL" and "KLUCEL" from Aqualon Co.), galactomannan (for example, that available under the trade names "PROGACYL" and "AVG" available from Lyndal Division of Colloids, Inc.), guar gums (for example, those supplied by Meer Corp.), agar, algin, carrageenan, plant gum exudates (for example, gum arabic, gum tragacanth, and karaya gum), locust bean gum, pectin, and microbial polysaccharides (for example, dextran, xanthan gum, and welan gum). Other useful thickeners include polyvinyl alcohols. Mixtures of thickeners can be utilized as the thickener component.

Xanthan gum is a preferred thickener, and usable xanthan gum is available under the trade name "KELZAN" series from Kelco Division of Merck & Co. Xanthan gum imparts to the masking solution particularly good shear-thinning, pseudoplastic properties, superior sag resistance, and enhanced resistance to paint bleed-through.

In general, an "effective amount" of thickener or film former should be used. By this it is meant that the amount of thickener should be sufficient to enable the masking solution to maintain a sag-resistant, overspray-resistant, continuous film when applied to a clean, painted, vertical panel when the panel is heated to ordinary spray booth temperatures (for example, at temperatures up to about 80° C.). As a general guide, the amount of thickener (especially when xanthan gum) preferably is about 0.05 to about 5 wt-%, more preferably about 0.5 to about 1.5 wt-%, and most preferably about 0.8 to about 1.0 wt-%, of total masking solution weight as the solution is applied to form the coating.

3. The Swelling, Blistering or Spotting Inhibitor

The swelling, blistering or spotting inhibitor is preferably an organic, hydrophilic, aliphatic polyhydroxy compound or mixture of polyhydroxy compounds herein called the "polyhydroxy component". The polyhydroxy component should generally be less volatile than glycerol (glycerine). Preferably it is no more volatile than diglycerol. The nonvolatile polyhydroxy component used in compositions according to the present invention should have a volatility of less than 0.30 wt %/minute, more preferably less than 0.20 wt %/minute, and most preferably less than 0.14 wt %/minute as determined by thermogravimetric analysis (TGA), at 150° C., using the method described hereinbelow.

Beyond this requirement, in general a characteristic of the preferred nonvolatile polyhydroxy component is that it be water-soluble (or soluble or dispersible in the liquid carrier) and compatible with the remaining ingredients in the masking solution. It should, in operation, inhibit overspray from penetrating the masking film. Nontoxic and odorless materials are preferred. Also, tacky materials that will provide good dust retention and a substantially continuous masking film when the masking solution is sprayed on a vehicle are preferred. However, "non-tacky" embodiments of the invention are envisioned wherein high molecular weight nonvolatile polyhydroxy compounds comprise most, if not all, of the nonvolatile portion of the composition. Further, preferably materials are utilized that are not likely to stain, streak, diffuse into, or penetrate the paint and are relatively easily removed with post-treatment water washes. Preferably, materials which will operate as plasticizers in the film are used.

Preferred nonvolatile polyhydroxy compounds for use as the high-temperature spotting inhibitor comprise oligomeric polyglycerols having the following formula:

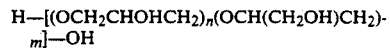

wherein m and n are each independently integers between 0 and 30, inclusive, with the requirement that m+n be greater than or equal to 2. By "inclusive" in this context it is meant that either m or n may be zero or 30. Preferably, m +n are at least 3 and are no greater than about 10. Preferred such materials comprise triglycerol, tetraglycerol, and mixtures of these two compounds together and/or with diglycerols or higher glycerols. Polyglycerols are known plasticizers, as indicated by U.S. Pat. Nos.: 3,114,650; 4,911,218; 5,049,609; and 5,058,648 which make general reference to use of glycerol and polyglycerols as plasticizers in compositions for protecting rubber.

Diglycerol may also be included within masking compositions according to the present invention. Compositions with diglycerol therein are improved relative to compositions with glycerol and no other polyhydroxy compounds. However, diglycerol is observed to be associated with some high temperature swelling, blistering or spotting, under test conditions.

Preferably, compositions according to a preferred embodiment of the present invention (as they are applied to form a mask) include at least 1% and typically about 1 to 100% by weight, of the nonvolatile polyglycerol component. More preferably, the compositions contain about 3 to 20% of the component by weight. Most preferred compositions include 3-10% of the component, even more preferably 5-10%. It should be understood that both "tacky" and "non-tacky" embodiments of the invention are contemplated whenever the nonvolatile portion of the composition may comprise 100% polyhydroxy component having a volatility no greater than that of diglycerol.

Preferred polyglycerols include, but are not limited to: The Hexapol ™ series available from: Hexagon Enterprises, Inc., Mountain Lakes, N.J. 07046; the Lonza ™ series available from LONZA, Inc., Fairlawn, N.J. 07410; the Karlshamns ™ series available from Karlshamns Lipid Specialties U.S.A., Columbus, Oh. 43201; the Davos ™ series available from Davos Chemical Corporation, Englewood Cliffs, N.J. 07632; Mazol ™ PG-3 available from PPG/Mazer Industries, Inc., Gurnee, Ill. 60031; and diglycerol, triglycerol, polyglycerol, and "High Purity" DIGLYCERINE ™ available from Solvay Performance Chemicals, Inc., Greenwich, Conn. 06830. Analysis of selected samples of these polyglycerols using supercritical fluid chromatography show these materials to be mixtures of oligomers containing, in some cases, appreciable amounts of unreacted glycerol monomer and diglycerol dimer. Some samples also included water. Residual water was determined by potentiometric titration using Karl Fischer reagent. The results of these analyses are shown in Table-4 of the Experimental Section hereinbelow.

4. Other Polyhydroxy Carrier Components

Compositions supporting the present invention may contain therein relatively low molecular weight (i.e., volatile) polyhydroxy compound(s), which will also serve the function of being a water-soluble liquid carrier dispersant for the remaining ingredients. Thus, with respect to application of the coating and plasticizer presence, they may serve some of the same functions as the nonvolatile polyhydroxy compounds. Mixtures of materials may be utilized as the volatile polyhydroxy component. Preferably nontoxic and odorless materials are utilized. Also, preferably tacky materials are used that will provide good dust retention and a substantially continuous masking film when applied.

Glycerol is a preferred material for use as the volatile polyhydroxy compound. Glycerol does not stain or streak the paint under normal, low temperature conditions, it is easily removed in the post-water wash, and it does inhibit paint overspray from penetrating the masking film. Glycerol is a material already known to be of appropriate physical and chemical characteristics for inclusion within such masking compounds, at least for low temperature applications, where paint swelling or spotting is not a problem, as indicated by the patents incorporated by reference hereinabove.

As indicated above, glycerol has been observed to generate high-temperature swelling, blistering or spotting when applied by itself or with a water carrier to a painted surface which is then exposed to high temperatures (110° C.). However, when it has been used in the presence of an effective amount of nonvolatile polyhydroxy component as defined hereinabove, the presence of glycerol in the masking compositions does not generally present as much of a problem.

In general, preferred low cost compositions according to the present invention (in the form that they are applied to create a film) will include therein an effective amount, up to about 15-20%, and preferably about 10-18%, glycerol (low molecular weight polyhydroxy component). The present invention may be construed, in some applications, as being a substitution of a portion of the glycerol component of conventional compositions with nonvolatile polyhydroxy component as defined hereinabove. If material cost is irrelevant, the preferred compositions contain no glycerol, i.e., all the glycerol is replaced with nonvolatile polyhydroxy component.

In some instances the nonvolatile polyhydroxy component, especially when it comprises a polyglycerol derived from glycerol, may include unreacted glycerol therein (see Table-4 hereinbelow). In extreme cases, the commercial polyglycerol component may include up to about 30%, by weight, unreacted glycerol therein. Herein, when it is said that an amount of glycerol is within some stated weight * range, reference is meant to the total amount of glycerol, whether present as a separately added ingredient or as a contaminant in a polyglycerol (or both). The presence of the glycerol contaminant in the commercial polyglycerol does not pose a problem, since inhibition to spotting, swelling or blistering is nevertheless provided.

5. Surfactants

One or more surfactants are added to the improved masking solution to promote wetting and detergency (cleaning) of the target surface and leveling of the applied masking film. The surfactants should be selected to minimize foam formation and sagging or slumping of the applied film. Foam formation during application of the masking liquid may lead to non-uniform film thickness and insufficient coverage of the surfaces to be protected.

Any of a variety of surfactants may be used in the practice of the present invention as long as the surfactant does not lead to staining or spotting. The use of anionic surfactants, while acceptable with monovalent ionic species, should be minimized or judiciously selected to avoid the salt deposition associated with low-temperature spotting problems. In general non-ionic surfactants derived from ethylene oxide and/or propylene oxide should also be minimized since surfactants derived from these monomers have been associated with high-temperature spotting phenomena. Possibly the decreasing solubility of polyethylene oxide in water with increasing temperature, causes undesirable phase-separation or precipitation and nucleation of these types of surfactants at the masking film-paint interface at high-temperatures and thus causes the spotting problems.

Preferred non-ionic surfactants useful in preparing the improved masking liquid of the present invention are the fatty alkanolamides which are known to stabilize the foaming action of other surfactants and to enhance detergency. The preferred surfactant is the diethanolamide of isostearic acid, available as Monoamid ™ 150-IS from Mona Industries Inc., Paterson, N.J. 07544. Other useful surfactants include fatty acid esters of glycerol and polyglycerol, and fluorocarbon surfactants of the types described in U.S. Pat. No. 4,347,266 (incorporated herein by reference).

As a general guide, the amount of surfactant preferably is an amount effective for providing desirable wetting. For typical applications, the amount should be about 0.01 to 5 wt-%, or preferably about 0.05 to 1.5 wt-%, most preferably about 0.1 to 1.0 wt-%, based on the composition of the masking solution as it is applied to form the film.

It is noted that in the absence of the high-temperature swelling, blistering or spotting inhibitor, a variety of surfactants appear to pose a problem with high-temperature spotting or paint destruction. The presence of the inhibitor according to the present invention alleviates the problem.

6. Adjuvants

Masking compositions according to the present invention may include any of a variety of adjuvants therein or a combination of such adjuvants. In general, adjuvants usable in compositions according to the present invention may be the same as those known in the art in similar masking compositions. Thus, the adjuvants may include pigments, dyes, indicators, pH buffers, extending fillers, monovalent cation electrolytes, water softening agents, defoamers, corrosion inhibitors, biocides and mixtures of these.

Preferred compositions will include at least an effective amount of water-soluble biocide therein to inhibit microbial-induced degradation of the solution during storage. Generally, biocides useful in compositions according to the present invention include chlorinated hydrocarbons, phenolics, quaternary ammonium compounds, organic sulphur compounds, metallic salts, organometallic compounds, and halogen-releasing compounds. The amount of biocide should preferably be sufficient to discourage degradation during a storage period of more than a year at temperatures up to about 38° C. A preferred amount of biocide is about 0.05 to about 0.5 wt-%, and more preferably about 0.1 to 0.2 wt-%, based on total weight of masking solution as it is applied to form the film.

The following is a list identifying some biocides suitable for inclusion in compositions according to the present invention. The list is not intended to be exclusive.

1. "COSAN ™ 91" of Cosan Chemical Corporation which is 2-[(hydroxymethyl) amino]ethanol;
2. "DOWICIDE ™ A" antimicrobial, which is sodium o-phenylphenate available from Dow Chemical Company;
3. "KATHON ™ LX" and "KATHON ™ LX 1.5%" supplied by Rohm & Haas Company which are mixtures of 5-chloro-2-methyl-4-isothiazolin-3-one and 2-methyl-4-isothiazolin-3-one;
4. The "TROYSAN ™"-brand biocides of Troy Chemical Company including:

a. "142" which is 3,5-dimethyltetrahydro 1,3,5,2H-thiadiazine-2-thione;
   b. "174" which is 2[(hydroxymethyl)-amino]ethanol;
   c. "190" which is 2-[hydroxymethyl)amino]-2-methyl-1-propanol;
   d. "192" which is 2-((hydroxymethyl)-amino]-2-methyl-propanol;
   e. "PMA-100" which is phenyl mercury acetate;
   f. "PMA-30" which is solubilized phenyl mercury acetate;
   g. "PMDS-10" which is di(phenyl mercury) dodecenyl succinate;
   h. "POLYPHASE ™" which is 3-iodo-2-propynyl butyl carbamate;
   i. "CMP" acetate which is chloromethoxypropyl mercuric acetate;
   j. "Copper 8" which is copper naphthenate;
   k. "Anti-Mildew ™ O" which is N-(trichloro-methylthio) phthalimide; and
   l. "PMO-30" which is phenyl mercury oleate.

Organo-mercury compounds are generally to be avoided if there are environmental and toxicological concerns.

Corrosion inhibitors useful in the practice of the invention include, but are not limited to: anodic inhibitors for example the nitrites, chromates, molybdates, tungstates, orthophosphates, and the silicate benzoates; cathodic inhibitors, for example, calcium bicarbonate, zinc sulfate, chromic sulfate, nickel sulfate, polyphosphate, and aminoethylene phosphonate; and, mixed inhibitors, for example, amines, triazoles, thiazols, and alkythioureas. Typically, about 0.03 to 0.2% by weight of corrosion inhibitor will be sufficient. Nitrites are preferred corrosion inhibitors because they avoid the extent of waste water pollution. Also, corrosion inhibitors with monovalent cations are preferred because they minimize the viscosity problems which can occur with zanthan gum in the presence of multi-valent cations.

In some instances, for example with xanthan gum film formers, a small amount of a monovalent cation electrolyte (like sodium bicarbonate) may be used. These cations help stabilize the solution rheology by controlling the ratio of [acid form]:[salt form] carboxy groups attached to the xanthan gum thus controlling the electrostatic repulsion between various portions of the polymer chains. The salts used preferably have monovalent cations, otherwise any suitable non-toxic or non-polluting salt in the desired pH range may be used.

C. Preparation of the Masking Composition

The ingredients of the masking composition may be mixed in any convenient order and by any convenient method. For solutions made from a solid thickener, a preferred mixing method generally involves pulverizing the thickener (or preferably employs a finely divided thickener that has been stirred to break up lumps) and blending the thickener in the polyhydroxy components to disperse the solid. This is then added to the water, other ingredients may then be added using slow agitation. Because the thickener may tend to increase the viscosity of the mixture over time, the mixer speed is preferably periodically increased to counteract any viscosity increase. Any surfactant to be used is preferably added last. The final solution is preferably mixed until well blended, for example for about 1½ hours or until the desired formulation viscosity is attained.

High shear mixing equipment is preferred; however, a "LIGHTNIN ™" mixer from Mixing Equipment Co., Chicago, Ill., has also been found to provide adequate mixing.

The masking solution preferably has a sufficiently low viscosity to enable it to be applied using atomizing spray nozzles of the types described below. Thus, the solution is preferably formulated to have a viscosity of less than about 4000 centipoise (4 pascal seconds) as measured at 21° C. on a Brookfield ™ RVF viscometer fitted with a #3 spindle at 20 rpm. In general, preferred solutions prepared as described herein will possess such a characteristic.

D. Use of the Masking Composition

Application of masking compositions according to the present invention may be in general as described in U.S. Pat. No. 5,104,711. The masking solution may be applied using atomizing spray equipment, rollers, brushes, rags, or any other technique that will apply a sufficiently thick coating to the surface to be protected. In general, coatings on the order of about 200–600 micrometers thick are preferred. An atomizing spray head application is preferred, applying a quantity which produces a non-sagging film just prior to its starting to run. A Model 223-965 pneumatic high pressure airless sprayer from Graco, Inc., Minneapolis, Minn. 55440, fitted with a number 621 spray tip, has been found to provide good results. A DeVilbiss LMG 500 internal mix pressure pot system (air atomized) fitted with a 2.2 mm nozzle also provides good results. Other sprayers utilizing an atomizing spray head which can be used are "HVLP" (high volume, low pressure) sprayers.

The recommended application procedure for the Graco airless, mechanical atomization sprayers is: to set the regulator at 550–620 KPa; to hold the spray gun at a right angle to the surface to be coated; and, to apply, in a single 50% overlapping application, to a thickness of 25–400 micrometers uniformly over the area to be protected preferably 100–400 micrometers, and most preferably 250–400 micrometers.

After application of the composition to a vehicle, the unmasked portion of the vehicle is painted. After the step of painting and drying the paint, the masking solution is removed, typically with a water wash from a hose or power washer.

PREFERRED FORMULATIONS

In general, preferred formulations for compositions according to the present invention are given in Table I. The percent figures are given as percent by weight, and the formulation represents the composition as it would be applied to a vehicle to form a mask.

TABLE I

| General Formula[1] | | Specific Formula | |
|---|---|---|---|
| water | 70–95% | deionized water | 78.08% |
| volatile polyhydroxy compound | 0–20% | glycerol (96% pure) | 15.15% |
| non-volatile polyhydroxy component | 4–100% | triglycerol (polyglycerol) Hexapol G-3[2] | 5.05% |
| thickener | 0.8–1% | xanthan gum (Kelzan) ™[3] | 0.88% |
| surfactant | 0.01–5% | Monomid ™ 156-IS[4] | 0.30% |
| biocide | 0.1–0.2% | Kathon ™ LX1.5%[5] | 0.14% |
| electrolyte | 0.2–0.4% | sodium bicarbonate[6] | 0.30% |
| corrosion inhibitor | 0.03–0.2% | sodium nitrite | 0.10% |

[1]Provided that selected percentages of all components sum to 100%
[2]Hexapol ™ G-3 is a trade name of a product which is available from Hexagon Enterprises, Inc., Mountain Lakes, New Jersey 07046.
[3]Kelzan ™ is a trade name of a product which is available from Kelco Division of Merck & Co., Inc. San Diego, California 92123. It is a xanthan gum (polysaccharide) produced in a fermentation process by the bacterium, *xanthomonas campestris*.
[4]Monamid ™ 150-IS is a trade name of a product which is available from Mona Industries, Inc., Paterson, New Jersey 07544. It is a 1:1 isostearic diethanolamide.
[5]Kathon ™ LX 1.5% is a trade name of a microbicide which is available from Rohm and Haas Company, Philadelphia, Pennsylvania 19105. The active ingredients are 2-methyl-4-isothiazolin-3-one (0.35%) and 5-chloro-2-methyl-4-isothiazolin-3-one (1.15%).
[6]The sodium bicarbonate enhances the ordered conformation of xanthan necessary for thickening by providing a low concentration of monovalent cation which reduces the electrostatic repulsion between carboxylate anions on the xanthan trisaccharide side chains.

The improved masking compositions of the invention also have utility as spray booth coatings. Unlike prior art spray booth coatings, tacky versions of the present invention prevent premature dryout due to the presence of the nonvolatile polyhydroxy component, which allows the spray booth coating to continue trapping airborne dust and dirt for extended time periods. In addition, the coating is easy to remove because it remains water flushable after use.

EXPERIMENTAL

It is unclear why the presence of nonvolatile polyhydroxy component in masking compositions according to the present invention generally inhibits high-temperature spotting, swelling, and blistering as defined herein. The experimental evidence that follows, however, permits some theoretical presentation and speculation. In particular, the protective film formed from conventional masking compositions generally includes only glycerol therein as the carrier/plasticizer component. It may be theorized that, under relatively high temperature conditions associated with dark vehicle surfaces exposed to the sun, the glycerol begins to evaporate from the composition. As the glycerol evaporates, it might be expected that the surfactant and other components may significantly partition into the phase represented by the paint/enamel, causing destruction of same. The presence of higher molecular weight polyhydroxy components (for example, triglycerol) may facilitate retention of a stable organic phase in the film with less of a likelihood of migration or diffusion of components into the paint/enamel.

In addition, as indicated above, it has been observed that glycerol itself is capable of penetration into the paint/enamel at temperatures of, for example, about 800° C. or higher, especially in the presence of surfactants. It may be that the presence of the higher molecular weight polyhydroxy compounds (for example, triglycerol) inhibits the likelihood of this partitioning or migration in a similar manner, i.e., by providing for a more stable organic phase in the protective coating, and thus a lower propensity (or concentration gradient in the case of diffusion) for migration of glycerol into the paint/enamel phase.

Volatility Measurements

The volatility of the polyhydroxy components used in compositions according to the present invention was measured thermogravimetrically using a Dupont ™ model 9900 Thermogravimetric Analyzer. The following instrumental parameters were selected: sample size-approximately 75 milligrams (the sample had an air interface surface area of approximately 66 square millimeters in the disposable aluminum sample pans used for the analysis), air flow rate—45 milliliters per minute. The following thermal profile was used, +20° C. per minute from room temperature to 110° C., isothermal at 110° C. for 3 minutes to remove traces of moisture and other low boiling volatile contaminants from the sample, 5° C. per minute from 110° C. to 150° C., and isothermal at 150° C. for an additional 70 minutes. The slope of the weight loss curve was determined from a 30 minute linear portion of the TGA plot from 20 minutes to 50 minutes (measured from t=0 at the time the sample temperature reached 150° C.). For the purpose of this invention, volatility is defined as minus one (−1) times the slope of the TGA weight loss curve. The volatility of glycerol (99% purity) as measured using this method was found to be 0.36 wt %/minute. The volatility of Hexapol G-3 was found to be 0.16 wt %/minute.

The invention is further illustrated by the following non-limiting examples, wherein all parts and percents are by weight, and all temperatures are in degrees Centigrade (° C.), unless otherwise stated.

EXAMPLES 1-25

These examples show preferred embodiments of the invention. Masking solutions containing preferred types of nonvolatile polyhydroxy component and the effect of changing the concentration of this component on the severity of high temperature spotting.

PREPARATION OF THICKENER CONTAINING PRE-MIX SOLUTION

A 3.5 liter master batch of thickener premix solution used to prepare preferred embodiments of improved masking liquid was made in a four-liter beaker using a low shear, air driven stirrer equipped with metal stirring rod fitted with two, 5cm (two-inch) diameter three-blade-marine propellers that were separated by about 5 cm. The following materials were added in the order listed:

| COMPONENT | AMOUNT (grams) |
|---|---|
| Deionized water (Solvent) | 3513.60 |
| Sodium nitrite (Corrosion Inhib.) | 4.50 |
| Sodium bicarbonate (Electrolyte) | 13.50 |
| Kathon TM LX 1.5% (Biocide) | 6.30 |
| Monamid TM 150-IS (Surfactant) | 13.50 |
| Kelzan TM (Thickener) | 39.60 |

After several minutes of gentle stirring, the sodium salts dissolved and Kathon TM biocide dissolved forming a totally transparent solution. The stirring rate was increased prior to the addition of the Monamid TM surfactant. Upon dissolution of the Monamid TM surfactant, the Kelzan TM thickener was gently sprinkled onto the upper wall of the vortex. After the addition of the Kelzan TM thickener was completed, the stirring rate was adjusted to maintain good movement of the solution without a vortex to minimize air entrainment. As the solution began to thicken, the stirring rate was increased to maintain effective mixing. Stirring continued until the Kelzan TM thickener particles were completely dissolved and solution appeared smooth as opposed to grainy, which took about two hours.

Several master batches were made using this procedure.

Preparation of the masking solution

Masking solutions were prepared by stirring the indicated quantity of nonvolatile polyhydroxy component shown in Table-1 into the indicated quantity of master batch premix solution prepared in Part A.

Preparation of Type-I test panels using air atomized, gravity feed sprayer

Steel test panels (30×10 cm) painted with black automotive paint and having a surface finish meeting the original equipment manufacturer specifications of Ford Motor Company and BASF, Inc., available from Advanced Coating & Technologies, Inc. of Hillsdale, Mich. 49242 under the designation #M33J100A, were sprayed with improved masking solution using an air atomized, gravity feed spray gun, Model #SGG-605 equipped with an 80EX spray nozzle available from the DeVilbiss Company, Toledo, Oh. 43692. The film thickness as applied was measured using a wet film thickness gauge and found to average about 300 micrometers. The test panel was baked in a forced air oven for two hours at 115° C. After cooling to room temperature, about one-fourth of the panel was rinsed with water to remove the masking solution. Upon drying, damage to the painted surface was rated using the rating scale described below. The panel was returned to the oven and baked an additional two hours at 115° C. A second one-fourth of the panel was rinsed to expose the coated surface. Again, after drying, damage to the painted surface was rated using the following rating scale:

| RATING | PAINT DAMAGE |
|---|---|
| 0 | No visible paint damage |
| 1 | The paint is swollen, i.e., the line of demarcation between coated and uncoated[1] areas can be seen but the swell line cannot be felt with a thumbnail or fingernail. |
| 2 | The paint is swollen in the areas which were coated and the swelling can be felt by rubbing a thumbnail or fingernail over the edge of the swelled region. In some cases, a light spotting or haze is also visible. |
| 3 | The paint is swollen and the spotting is extensive. |
| 4 | The paint is softened and blistered and can easily be scraped off with a thumbnail. |

[1] The uncoated areas are present either intentionally as a result of a small portion of the coating being removed after spray application of the masking solution, or unintentionally as a result of incomplete wetting of the painted surface, shrinkage of the liquid mask upon drying, or entrained air bubbles which were trapped in the coating.

Application of this rating scale is subjective, hence, repeat ratings do not necessarily fully agree among experiments. However, trends toward more or less severe high temperature spotting are clearly evident within a particular experiment.

TABLE 1

| Example No. | Type of Spotting Inhibitor | Amount of Spotting Inhibitor (grams) | Amount of Pre-Mix Solution (grams) | Rating 2 hr | Rating 4 hr |
|---|---|---|---|---|---|
| 1 | Hexapol TM G-3 | 80.8 | 319.2 | 0 | 0 |

TABLE 1-continued

| Example No. | Type of Spotting Inhibitor | Amount of Spotting Inhibitor (grams) | Amount of Pre-Mix Solution (grams) | Rating 2 hr | Rating 4 hr |
|---|---|---|---|---|---|
| 2 | Hexpol ™ G-3 | 40.4 | 319.2 | 0 | 0 |
| 3 | Hexapol ™ G-3 | 20.2 | 319.2 | 0 | 0-1 |
| 4 | Hexapol ™ G-3 | 8.1 | 319.2 | 2 | 2 |
| 5 | Hexapol ™ G-3 | 4.0 | 319.2 | 2 | 3 |
| 6 | Hexapol ™ G-6 | 20.2 | 319.2 | 0 | 0 |
| 7 | Hexapol ™ G-10 | 20.2 | 319.2 | 0 | 0 |
| 8 | Karlshamns ™ Decaglycerol | 40.4 | 319.2 | 0 | 0 |
| 9 | Mazol ™ Triglycerol | 40.4 | 319.2 | 0-1 | 0-1 |
| 10 | Davos ™ Polyglycerine 06 | 40.4 | 319.2 | 0 | 0 |
| 11 | Davos ™ Polyglycerine 04 | 40.4 | 319.2 | 0-1 | 1 |
| 12 | CCL ™ Diglycerol | 10.1 | 79.8 | 1 | 1 |
| 13 | Hexapol ™ G-6 | 80.8 | 319.2 | 1-2 | 1-2 |
| 14 | Hexapol ™ G-6 | 40.4 | 319.2 | 1-2 | 1 |
| 15 | Hexapol ™ G-6 | 20.2 | 319.2 | 2 | 2 |
| 16 | Hexapol ™ G-6 | 8.1 | 319.2 | 3 | 2-3 |
| 17 | Hexapol ™ G-6 | 4.0 | 319.2 | 3 | 3 |
| 18 | Hexapol ™ G-10 | 40.4 | 159.6 | 1 | 1-2 |
| 19 | Hexapol ™ G-10 | 20.2 | 159.6 | 1 | 1-2 |
| 20 | Hexapol ™ G-10 | 10.1 | 159.6 | 1 | 2 |
| 21 | Hexapol ™ G-10 | 4.0 | 159.6 | 3 | 3 |
| 22 | Hexapol ™ G-10 | 2.0 | 159.6 | 3 | 3 |
| 23 | Lonza ™ Triglycerol (78%) | 112.0 | 798.0 | 0-1 | 0-1 |
| 24 | Lonza ™ Hexaglycerol (85%) | 50.4 | 359.0 | 0 | 0 |
| 25 | Lonza ™ Decaglycerol (80%) | 16.8 | 119.7 | 0 | 0 |

Comparative Examples 26 and 27

These examples show the effect of replacing the nonvolatile polyhydroxy component with glycerine (96% purity).

These comparative examples were prepared using the procedure described above. The premix solution were mixed with glycerine (96% purity) instead of nonvolatile polyhydroxy component.

| | |
|---|---|
| Example 26 contained about 20% by weight glycerine: | 2 hour rating was a 3 |
| | 4 hour rating was a 3 |
| Example 27 contained about 6% by weight glycerine: | 2 hour rating was a 3 |
| | 4 hour rating was a 3 |

EXAMPLES 28–66

These examples show the effect of replacing various portions of the nonvolatile polyhydroxy component with glycerine (96% purity). These examples were prepared using the procedure described above.

TABLE 2

| Example No. | Nonvolatile Polyhydroxy Component Type | Nonvolatile Polyhydroxy Component Amount (grams) | Glycerol (99.7%) (grams) | Pre-mix amount (grams) | Wet Thickness (μm) | Rating 2 hr | Rating 4 hr |
|---|---|---|---|---|---|---|---|
| 28 | Hexapol ™ G-3 | 10.1 | 0.0 | 159.6 | 250 | 1 | 1 |
| 29 | Hexapol ™ G-3 | 7.5 | 2.6 | 159.6 | 250 | 1 | 2 |
| 30 | Hexapol ™ G-3 | 5.0 | 5.1 | 159.6 | 200 | 2 | 2 |
| 31 | Hexapol ™ G-3 | 2.5 | 7.6 | 159.6 | 225 | 2 | 2 |
| 32 | Hexapol ™ G-3 | 1.0 | 9.6 | 159.6 | 200 | 3 | 3 |
| 33 | Hexapol ™ G-3 | 0.0 | 10.1 | 159.6 | 150 | 3 | 3 |
| 34 | Hexapol ™ G-3 | 20.2 | 0.0 | 159.6 | 250 | 1 | 1-2 |
| 35 | Davos ™ Polyglycerine 06 | 15.0 | 0.0 | 239.4 | 250 | 0 | 0 |
| 36 | Davos ™ Polyglycerine 06 | 11.3 | 3.9 | 239.4 | 250 | 1 | 0 |
| 37 | Davos ™ Polyglycerine 06 | 7.5 | 7.7 | 239.4 | 250 | 3 | 2 |
| 38 | Davos ™ Polyglycerine 06 | 3.8 | 14.4 | 239.4 | 250 | 3 | 3 |
| 39 | Davos ™ Polyglycerine 06 | 1.5 | 14.4 | 239.4 | 250 | 3 | 3 |
| 40 | Davos ™ Polyglycerine 06 | 0.0 | 15.2 | 239.4 | 250 | 3 | 3 |
| 41 | Hexapol ™ G-3 | 20.2 | 0.0 | 159.6 | 250 | 0 | 0 |
| 42 | Hexapol ™ G-3 | 15.0 | 5.2 | 159.6 | 250 | 0 | 0 |
| 43 | Hexapol ™ G-3 | 10.0 | 10.2 | 159.6 | 250 | 1 | 1 |
| 44 | Hexapol ™ G-3 | 5.0 | 15.2 | 159.6 | 250 | 2 | 3 |
| 45 | Hexapol ™ G-3 | 2.0 | 19.2 | 159.6 | 250 | 2 | 3 |
| 46 | Hexapol ™ G-3 | 0.0 | 20.2 | 159.6 | 250 | 3 | 3 |
| 47 | Davos ™ Polyglycerine 06 | 20.2 | 0.0 | 159.6 | 250 | 0 | 0 |
| 48 | Davos ™ Polyglycerine 06 | 15.0 | 5.2 | 159.6 | 250 | 0 | 0 |
| 49 | Davos ™ Polyglycerine 06 | 10.0 | 10.2 | 159.6 | 250 | 2 | 2 |
| 50 | Davos ™ | 5.0 | 15.2 | 159.6 | 250 | 2 | 3 |

TABLE 2-continued

| Example No. | Nonvolatile Polyhydroxy Component Type | Amount (grams) | Glycerol (99.7%) (grams) | Pre-mix amount (grams) | Wet Thickness (μm) | Rating 2 hr | Rating 4 hr |
|---|---|---|---|---|---|---|---|
| 51 | Polyglycerine 06 Davos TM | 2.0 | 19.2 | 159.6 | 250 | 3 | 3 |
| 52 | Polyglycerine 06 Davos TM | 0.0 | 20.2 | 159.6 | 250 | 3 | 3 |
| 53 | Polyglycerine 06 Hexapol TM G-6 | 20.2 | 0.0 | 159.6 | 250 | 0 | 0-1 |
| 54 | Hexapol TM G-6 | 15.0 | 5.2 | 159.6 | 250 | 0 | 0-1 |
| 55 | Hexapol TM G-6 | 10.0 | 10.2 | 159.6 | 250 | 0-1 | 0-1 |
| 56 | Hexapol TM G-6 | 5.0 | 15.2 | 159.6 | 250 | 2 | 2 |
| 57 | Hexapol TM G-6 | 2.0 | 19.2 | 159.6 | 250 | 2 | 3 |
| 58 | Hexapol TM G-6 | 0.0 | 20.2 | 159.6 | 250 | 3 | 3 |
| 59 | Hexapol TM G-10 | 20.2 | 0.0 | 159.6 | 250 | 0 | 0 |
| 60 | Hexapol TM G-10 | 15.0 | 5.2 | 159.6 | 250 | 0 | 2 |
| 61 | Hexapol TM G-10 | 10.0 | 10.2 | 159.6 | 250 | 0 | 2 |
| 62 | Hexapol TM G-10 | 5.0 | 15.2 | 159.6 | 250 | 1-2 | 3 |
| 63 | Hexapol TM G-10 | 2.0 | 19.2 | 159.6 | 250 | 3 | 3 |
| 64 | Hexapol TM G-10 | 0.0 | 20.2 | 159.6 | 250 | 3 | 3 |
| 65 | Lonza TM Triglycerol | 40.4 | 121.2 | 638.4 | 250 | 0 | 0 |
| 66 | Lonza TM Decaglycerol | 40.4 | 121.2 | 638.4 | 250 | 0 | 0 |

EXAMPLES 67 and 68

These examples are included to show the breadth of the invention. A second type of paint panel and an airless sprayer were used to prepare the test panels in order to demonstrate the broader applicability of the invention to a variety of painted surfaces and spray application methods.

Example 67 was prepared by mixing the indicated percentage of Hexapol TM G-3 and glycerine with 2.34 Kg. of the premix of Example 1 to form a homogeneous solution.

Preparation of Prior Art Masking Solution for Comparative Example 68

The prior art masking solution was prepared according to the following formula using the procedure to make the premix solution of Examples 1 through 25. Since this prior art formula contained no nonvolatile polyhydroxy compound, the premix formed the masking solution. The glycerine plasticizer was added in the order indicated in the formula.

| COMPONENT | AMOUNT (grams) |
|---|---|
| Deionized water (Solvent) | 2968.6 |
| Glycerine (96% purity) (Plasticizer) | 768.0 |
| Kathon TM LX 1.5% (Biocide) | 5.32 |
| Kelzan TM S (Thickener) | 30.40 |
| Bioterge TM AS-40 (Surfactant) | 27.74 |

Preparation of Type-II test panels using an airless sprayer

Steel test panels (60×45 cm) painted with black automotive paint having a surface finish meeting the original equipment manufacturer specifications of General Motors Corporation and DuPont Chemical Company, Inc., available from Advanced Coating & Technologies, Inc. of Hillsdale, Mich. 49242 under the designation #998-4065 were sprayed with the indicated masking solutions using a pneumatic, high-pressure airless sprayer, Model 223-965 equipped with a number 621 spray tip, available from Graco, Inc., Minneapolis, Minn. 55440. The film thicknesses as applied were measured using a wet film thickness gauge and found to average about 380 micrometers. The test panels were baked in a forced air oven for four hours at 1150C. After cooling to room temperature, the panels were rinsed with water to remove the masking solution. Upon drying, the panels were examined and rated using the rating scale above.

| Example No. | Description | Rating |
|---|---|---|
| 67 | Hexapol TM G-3 (5% by weight) Glycerine (96% purity) (15% by weight) | 0-1 |
| 68 | Prior Art Masking Solution (Comparative) | 3-4 |

EXAMPLES 69-174

These examples show what kinds of materials cause swelling, blistering and/or high temperature spotting and related damage to painted surfaces. Several drops of the materials shown in Table-3 were applied to the Type-I test panels described above. Several drops of each type of material were spread onto test panels with either a stir stick or a small paint brush; however, some of these materials did not wet the paint and retracted into beads or pools of varying and indeterminate size. The test panels were baked in a forced air oven at 110° C. for four hours, allowed to cool to room temperature, rinsed with water, and air dried. Damage to the painted surface was rated using the following rating scale:

| RATING | PAINT DAMAGE |
|---|---|
| 0 | No visible paint damage |
| 1 | The paint is swollen, i.e., the line of demarcation between coated and uncoated[1] areas can be seen but the swell line cannot be felt with a thumbnail or fingernail. |
| 2 | The paint is swollen in the areas which were coated and the swelling can be felt by rubbing a thumbnail or fingernail over the edge of the swelled region. |
| 3 | The paint is swollen and softened so that it can be indented with a thumbnail. |

| RATING | PAINT DAMAGE |
|---|---|
| 4 | The paint is swollen, softened and slightly roughened and with effort some of the paint can be scraped off with a thumbnail. |
| 5 | The paint is badly blistered and can easily be scraped off with a thumbnail. |
| E | When an E follows the numerical rating, a material was observed to have extruded to the surface after a period of 24 hours. |
| Evaporated | When the notation "Evaporated" follows the numerical rating, the applied material evaporated in the oven during the test interval. |
| H | When an H follows the numerical rating an inorganic-water spotting type haze which could not be rinsed or wiped off the surface was observed. |

[1] The uncoated areas are present either intentionally as a result of a small portion of the coating being removed after spray application of the masking solution, or unintentionally as a result of incomplete wetting of the painted surface, shrinkage of the liquid mask upon drying, or entrained air bubbles which were trapped in the coating.

Application of this rating scale is subjective; hence, repeat ratings do not necessarily fully agree among experiments. However, trends toward more or less severe high temperature spotting are clearly evident among different experiments.

Materials 74, 85 and 133 through 172 are commercially available surfactants.

TABLE 3

| Component No. | Material | Rating/Comments |
|---|---|---|
| 69 | TMPD glycol[1] | 1-2/E/Evaporated |
| 70 | Neopentyl glycol[2] | 0/Evaporated |
| 71 | NPG-90[3] | 3/Evaporated |
| 72 | CHDM-D glycol[3a] (Cyclohexane dimethanol) | 3-4 |
| 73 | Trimethylol propane[4] | 5 |
| 74 | Glyceryl monolaurate[5] | 5 |
| 75 | Polypropylene Glycol 150[6] | 3/Evaporated |
| 76 | Polyol TM LHT-240, 3M Grade[7] | 3-4 |
| 77 | Polyol TM PPG-425, 3M Grade[7] | 5 |
| 78 | Polyol TM PPG-725[7] | 5 |
| 79 | MPDIOL TM Glycol[8] | 2/Evaporated |
| 80 | Carbowax TM Polyethylene Glycol 200[9] | 3/E |
| 81 | Carbowax TM Polyethylene Glycol 400[9] | 3/E |
| 82 | Carbowax TM Polyethylene Glycol 600[9] | 3/E |
| 83 | Carbox TM Polyethylene 300[9] | 5/E |
| 84 | Polyol TM LG-650, 3M Grade[10] | 5/E |
| 85 | Monamid TM 150-IS[11] | 3/E |
| 86 | Glycerol A.R.[12] | 3-4/E |
| 87 | Glycerol (96.0% - dilution of preceding with deionized water) | 3-4/E |
| 88 | Hexapol TM G-6[13] | 1 |
| 89 | Hexapol TM G-10[13] | 1 |
| 90 | Triglycerol, FGK (77.9%)[14] | 1 |
| 91 | Hexaglycerol, 85K, FG Int. (85%)[14] | 1 |
| 92 | Decaglycerol, FGK (79.6%)[14] | 1 |
| 93 | Hexaglycerol[15] | 0 |
| 94 | Decaglycerol[15] | 1 |
| 95 | Polyglycerine 04[16] | 0 |
| 96 | Polyglycerine 06[16] | 0 |
| 97 | Mazol TM PG-3 (Triglycerol)[17] | 1 |
| 98 | Diglycerol, 97 + %[18] | 1/E |
| 99 | Hexapol TM G-3[13] | 2 |
| 100 | 25% Glycerol[12] 75% Hexapol TM G-6[13] | 2 |
| 101 | 25% Glycerol[12] 75% Hexapol TM G-6[13] | 3 |
| 102 | 25% Glycerol[12] 75% Hexapol TM G-10[13] | 3 |
| 103 | 25% Glycerol[12] 75% Triglycerol[14] | 2 |
| 104 | 25% Glycerol[12] 75% Hexaglycerol[14] | 2 |
| 105 | 25% Glycerol[12] 75% Decaglycerol[14] | 1 |
| 106 | 25% Glycerol[12] 75% Hexaglycerol[15] | 2 |
| 107 | 25% Glycerol[12] 75% Decaglycerol[15] | 2 |
| 108 | 25% Glycerol[12] 75% Polyglycerine 04[16] | 1 |
| 109 | 25% Glycerol[12] 75% Polyglycerine 06[16] | 1 |
| 110 | 25% Glycerol[12] 75% Mazol TM PG-3 (Triglycerol)[17] | 2 |
| 111 | 50% Glycerol[12] 50% Hexapol TM G-3[13] | 4 |
| 112 | 50% Glycerol[12] 50% Hexapol TM G-6[13] | 3 |
| 113 | 50% Glycerol[12] 50% Hexapol TM G-10[13] | 4 |
| 114 | 50% Glycerol[12] 50% Triglycerol[14] | 4 |
| 115 | 50% Glycerol[12] 50% Hexaglycerol[14] | 4 |
| 116 | 50% Glycerol[12] 50% Decaglycerol[14] | 1-3 |
| 117 | 50% Glycerol[12] 50% Hexglycerol[15] | 4 |
| 118 | 50% Glycerol[12] 50% Decaglycerol[15] | 2 |
| 119 | 50% Glycerol[12] 50% Polyglycerine 04[16] | 4 |
| 120 | 50% Glycerol[12] 50% Polyglycerine 06[16] | 2-3 |
| 121 | 50% Glycerol[12] 50% Mazol TM PG-3 (Triglycerol)[17] | 2 |
| 122 | 75% Glycerol[12] 25% Hexapol TM G-3[13] | 4 |
| 123 | 75% Glycerol[12] 25% Hexapol TM G-6[13] | 4 |
| 124 | 75% Glycerol[12] 25% Hexapol TM G-10[13] | 4 |
| 125 | 75% Glycerol[12] 25% Triglycerol[14] | 4 |
| 126 | 75% Glycerol[12] 25% Hexaglycerol[14] | 4 |
| 127 | 75% Glycerol[12] 25% Decaglycerol[14] | 4 |
| 128 | 75% Glycerol[12] 25% Hexaglycerol[15] | 4 |
| 129 | 75% Glycerol[12] 25% Decaglycerol[15] | 4 |
| 130 | 75% Glycerol[12] 25% Polyglycerine 04[16] | 4 |
| 131 | 75% Glycerol[12] 25% Polyglycerine 06[16] | 4 |
| 132 | 75% Glycerol[12] 25% Mazol TM PG-3 (Triglycerol)[17] | 4 |
| 133 | Monamid TM 718[19] | 3/E |
| 134 | Monamid TM 150-ADY[20] | 3/E |
| 135 | Monamid TM 150-CW[21] | 3/E |
| 136 | Monawet TM MO-84R2W[22] | —/H (very light) |
| 137 | Alpha-Step TM LD-200[23] | 2-3 |
| 138 | Amidox TM C-5[24] | 3/E |
| 139 | Bio-Soft TM D-40[25] | —/H |
| 140 | Bio-Soft TM LD-150[26] | 2 |
| 141 | Bioterge TM AS-40[27] | —/H |
| 142 | Ninol TM 11-CM[28] | 3/E |
| 143 | Ninol TM 40-CO[29] | 3/E |
| 144 | Steol TM CS-460[30] | 0 |
| 145 | Witcamide TM 128T[31] | 3/E |

TABLE 3-continued

| Component No. | Material | Rating/ Comments |
|---|---|---|
| 146 | Witconate ™ AOS[32] | —/H |
| 147 | Witconol ™ 2421[33] | 5/E |
| 148 | Witconol ™ 2500[34] | 3/E |
| 149 | Witconol ™ 2720[35] | 3/E |
| 150 | Emcol ™ 18L[36] | 2 |
| 151 | Triton ™ X-100[37] | 5/E |
| 152 | Triton ™ X-305[37] | 3/E |
| 153 | Tergitol ™ TMN-3[38] | 2-3 |
| 154 | Tergitol ™ TMN-10[39] | 3/E |
| 155 | Tergitol ™ XL-80N[40] | 3/E |
| 156 | Tergitol ™ D-683[41] | 3 |
| 157 | Tergitol ™ XD[42] | 3/E |
| 158 | Tergitol ™ Min-Foam 1X[43] | 3 |
| 159 | Tergitol ™ 15-S-3[43] | 3 |
| 160 | Tergitol ™ 15-S-12[43] | 3/E |
| 161 | Surfynol ™ 61[44] | 0/Evaporated |
| 162 | Surfynol ™ D-101[45] | 3 |
| 163 | Surfynol ™ 104PA[46] | 0 |
| 164 | Surfynol ™ 440[47] | 3/E |
| 165 | Surfynol ™ 465[47] | 3/E |
| 66 | Surfynol ™ 485[47] | 3/E4 |
| 167 | Siponate ™ DS-10[48] (0.05 g/1.0 g Deionized H$_2$O) | —/H (very light) |
| 168 | Decyl sodium sulfate[49] (0.05 g/1.0 g Deionized H$_2$O) | —/H (etching also) |
| 169 | Fluorad ™ FC-170C[50] | 3/E |
| 170 | Fluorad ™ FC-171[51] | 1 |
| 171 | Octyl sodium sulfate[52] (0.025 g/1.0 g Deionized H$_2$O) | —/H (etching also) |
| 172 | Aerosol ™ OT-100[53] (0.025 g/1.0 g Deionized H$_2$O) | 0 |
| 173 | Deionized water | 0-1/H (very light on outline only) |

[1] 100%; Trimethyl pentane diol. Available from Eastman Chemicals Division (Division of Eastman Kodak Company), Kingsport, Tennessee 37662.
[2] 99%; 2,2-Dimethyl-1,3-propanediol; solid. Available from Hoechst Celanese Corporation, Dallas, Texas 75356-9320.
[3] 90% in H$_2$O; 2,2-Dimethyl-1,3-propanediol (neopentyl glycol); solid slurry/crystals in H$_2$O. Available from Eastman Chemicals Division (Division of Eastman Kodak Company), Kingsport, Tennessee 37662.
[3a] 99%; 1,4-Cyclohexane dimethanol. Available from Eastman Chemicals Division (Division of Eastman Kodak Company), Kingsport, Tennessee 37662.
[4] Available from Hoechst Celanese Corporation, Dallas, Texas 75356-9320.
[5] Glyceryl monolaurate, self emulsifying; ALDO ™ MLD Food Grade. Available from LONZA Inc., Fairlawn, New Jersey 07410.
[6] Dipropyleneglycol; Tripropyleneglycol. Available from Union Carbide Chemicals and Plastics Company, Inc., Danbury, Connecticut 06817-0001.
[7] Polyalkylene oxide polyol. Available from Union Carbide Chemicals and Plastics Company, Inc., Danbury, Connecticut 06817-0001.
[8] 2-Methyl-1,3-pentanediol. Available from ARCO Chemical Company, Newtown Square, Pennsylvania 19073.
[9] Poly(oxy-1,2-ethanediyl), α-hydro-μ-hydroxy. Available from Union Carbide Chemicals and Plastics Company, Inc., Danbury, Connecticut 06817-0001.
[10] Glycerine started polypropylene glycol. Available from Union Carbide Chemicals and Plastics Company, Inc., Danbury, Connecticut 06817-0001.
[11] Isostearic diethanolamide. Available from Mona Industries, Inc., Paterson, New Jersey 07544.
[12] 99.7%. Available from Mallinckrodt Specialty Chemicals Company, Paris, Kentucky 40361.
[13] Available from Hexagon Enterprises, Inc., Mountain Lakes, New Jersey 07046.
[14] Available from LONZA Inc., Fairlawn, New Jersey 07410.
[15] Available from Karlshamns Lipid Specialties USA, Columbus, Ohio 43201.
[16] Available from Davos Chemical Corporation, Englewood Cliffs, New Jersey 07632.
[17] Available from PPG/Mazer Industries, Inc., Gurnee, Illinois 60031.
[18] Available from Custom Lab Supply, Livermore, California 94550.
[19] 100%; Stearic diethanolamide. Available from Mona Industries, Inc., Paterson, New Jersey 07544.
[20] 100%; Linoleic diethanolamide (80%) and others. Available from Mona Industries, Inc., Paterson, New Jersey 07544.
[21] 100%; Capric diethanolamide. Available from Mona Industries, Inc., Paterson, New Jersey 07544.
[22] 84% in propylene glycol; Sodium dioctyl sulfosuccinate. Available from Mona Industries, Inc., Paterson, New Jersey 07544.
[23] 50%; Anionic/nonionic blend based on sodium alpha sulfo methyl ethyl laurate. Available from Stepan Company, Northfield, Illinois 60093.
[24] 100%; PEG-6 cocamide. Available from Stepan Company, Northfield, Illinois 60093.
[25] 40%; Sodium alkylbenzene sulfonate, linear. Available from Stepan Company, Northfield, Illinois 60093.
[26] 48%; Anionic/nonionic blend. Available from Stepan Company, Northfield, Illinois 60093.
[27] 40%; Sodium alpha olefin sulfonate. Available from Stepan Company, Northfield, Illinois 60093.
[28] 100%; Coconut diethanolamide, modified (16% free fatty acid and 27% free amine). Available from Stepan Company, Northfield, Illinois 60093.
[29] 100%; Coconut diethanolamide (contains glycerine). Available from Stepan Company, Northfield, Illinois 60093.
[30] 60%; Sodium lauryl ethoxysulfate (contains 15% ethanol and 21% glycol ether). Available from Stepan Company, Northfield, Illinois 60093.
[31] Coconut diethanolamide (contains 6% diethanolamine). Available from Witco Corporation, Melrose Park, Illinois 60160.
[32] 39%; Sodium C$_{14-16}$ olefin sulfonate. Available from Witco Corporation, Melrose Park, Illinois 60160.
[33] Glycerol monooleate. Available from Witco Corporation, Melrose Park, Illinois 60160.
[34] Sorbitan ™ monooleate. Available from Witco Corporation, Melrose Park, Illinois 60160.
[35] Polysorbate ™ 20. Available from Witco Corporation, Melrose Park, Illinois 60160.
[36] Polyglycerol isostearate. Available from Witco Corporation, Melrose Park, Illinois 60160.
[37] 100%; Octylphenol ethoxylate. Available from Union Carbide Chemicals and Plastics Company, Inc., Danbury, Connecticut 06817-0001.
[38] 100%; Ethoxylated 2,6,8-trimethyl-4-nonanol. Available from Union Carbide Chemicals and Plastics Company, Inc., Danbury, Connecticut 06817-0001.
[39] 90%; Ethoxylated 2,6,8-trimethyl-4-nonanol. Available from Union Carbide Chemicals and Plastics Company, Inc., Danbury, Connecticut 06817-0001.
[40] Mixture of alkyloxylated primary alcohols. Available from Union Carbide Chemicals and Plastics Company, Inc., Danbury, Connecticut 06817-0001.
[41] 100%; Alkyloxylated alkyl phenol. Available from Union Carbide Chemicals and Plastics Company, Inc., Danbury, Connecticut 06817-0001.
[42] Copolymer of ethylene oxide and propylene oxide. Available from Union Carbide Chemicals and Plastics Company, Inc., Danbury, Connecticut 06817-0001.
[43] 100%; Ethoxylated linear secondary alcohols. Available from Union Carbide Chemicals and Plastics Company, Inc., Danbury, Connecticut 06817-0001.
[44] 100%; 3,5-dimethyl-1-hexyn-3-ol. Available from Air Products & Chemicals, Inc., Allentown, Pennsylvania 18195-1501.
[45] 100%; Petroleum hydrocarbon and glycol blend. Available from Air Products & Chemicals, Inc., Allentown, Pennsylvania 18195-1501.
[46] 2,4,7,9-tetramethyl-5-decyn-4,7-diol (50% in isopropanol). Available from Air Products & Chemicals, Inc., Allentown, Pennsylvania 18195-1501.
[47] 100%; Ethoxylates of 2,4,7,9-tetramethyl-5-decyn-4,7-diol. Available from Air Products & Chemicals, Inc., Allentown, Pennsylvania 18195-1501.
[48] Sodium dodecyl benzenesulfonate. Available from Alcolac, Baltimore, Maryland 21226.
[49] Available from Eastman Kodak Company, Rochester, New York 14650.
[50] Fluorinated alkyl polyoxyethylene ethanols (contains 12% polyoxyethylene glycol). Available from 3M Company, St. Paul, Minnesota 55144-1000.
[51] 100%; Fluorinated alkyl alkoxylates. Available from 3M Company, St. Paul, Minnesota 55144-1000.
[52] Available from Eastman Kodak Company, Rochester, New York 14650.
[53] Sodium dioctyl sulfosuccinate. Available from American C...

TABLE 4

| Polyglycerol | % H$_2$O[4] | Glycerol[2] (% by weight) | H$_2$O + Glycerol | Diglycerol[3] (area %) |
|---|---|---|---|---|
| Diglcerol (CLS) | — | — | — | 97.0 |
| Hexapol ™ G-3 | <2% | 26.0 | ≈27 | 44.3 |
| Hexapol ™ G-6 | <2% | 15.5 | ≈16.5 | 35.7 |
| Hexapol ™ G-10 | <2% | 3.5 | ≈4.5 | 26.0 |
| LONZA ™ Triglycerol | 22.1% | 16.0 | 38.1 | 37.6 |
| LONZA ™ HEXAGLYCEROL | ≈15% | 5.0 | ≈20 | 26.2 |
| LONZA ™ DECAGLYCEROL | 20.4% | 3.5 | 23.9 | 23.8 |
| Glycerol 96% | 4% | 96.0 | 100 | N.D.[1] |
| Glycerol 99.7% | 0.3% | 99.7 | 100 | N.D.[1] |
| Karlshamn Hexaglycerol | ≈4% | 8.0 | ≈12 | 27.9 |
| Karlshamn Decaglycerol | ≈1 | 4.0 | ≈5 | 24.8 |
| PPG-Mazer Triglycerol | 9–12% | 18.5 | 27.5–30.5 | 40.9 |
| DAVOS ™ Polyglycerine 04 | 0.26% | 5.0 | 5.3 | 17.3 |
| DAVOS ™ Polyglycerine 06 | 0.12% | 2.0 | 2.1 | 11.4 |

[1] N.D. = Not Determined
[2] The percentage of glycerol as a contaminant in the commercial source of the polyglycerol as determined by supercritical fluid chromatography.
[3] The percentage of diglycerol as a contaminant in the commercial source of the polyglycerol (area %) as determined by supercritical fluid chromatography.
[4] Determined by potentiometric titration using Karl Fischer reagent.

What is claimed is:

1. A masking composition for application to an area of a surface to protect said area from paint overspray; said masking composition comprising:
   (a) an amount of surfactant effective to promote wetting and detergency of said surface and leveling of said masking composition; and
   (b) at least 1% by weight based on total weight of said masking composition of an oligomeric polyglycerol material according to the formula:

H—[(OCH$_2$CHOHCH$_2$)$_n$(OCH(CH$_2$OH)CH$_2$)$_m$]—OH wherein m and n are each integers between 0 and 30 inclusive, provided that m +n is greater than or equal to 2.

2. The masking composition according to claim 1, wherein m+n is 3 to 10 inclusive.

3. The masking composition according to claim 1, further comprising at least 10% by weight glycerol based on total weight of said masking composition.

4. The masking composition according to claim 1, wherein said surfactant is selected from the group consisting of fatty acid alkanolamides, fatty acid esters of glycerol, fatty acid esters of polyglycerol, fluorocarbon surfactants, and mixtures thereof.

5. The masking composition according to claim 1, further comprising an amount of film forming thickener effective to maintain said masking composition as a sag-resistant, overspray-resistant continuous film and selected from the group consisting of: hydroxyethylcellulose hydroxypropylcellulose, hydroxypropylmethyl cellulose, sodium carboxymethyl cellulose, glyactomanine, guar gum, agar, algin, carrageenan, gum arabic, gum tragacanth, karaya gum, locust bean gum, pectin, microbial polysaccharides, polyvinyl alcohols, and mixtures thereof.

6. The masking composition according to claim 1, further comprising an amount of film forming thickener effective to maintain said masking composition as a sag-resistant, overspray-resistant continuous film, wherein said thickener comprises xanthan gum.

7. The masking composition according to claim 11, further comprising at least 70% by weight water therein based on total weight of said masking composition.

8. The masking composition according to claim 7, further comprising at least about 0.05% by weight of film forming thickener based on total weight of said masking composition.

9. The masking composition according to claim 1, further comprising at least about 10% by weight glycerol based on total weight of said masking composition.

10. A masking composition for application to an area of a surface to protect said area from paint overspray; said masking composition comprising:
    (a) at least 10% by weight glycerol based on total weight of said masking composition; and
    (b) at least 1% by weight based on total weight of said masking composition of an oligomeric polyglycerol material according to the formula:

H—[(OCH$_2$CHOHCH$_2$)$_n$(OCH(CH$_2$OH)CH$_2$)$_m$]—OH wherein m and n are each integers between 0 and 30, inclusive, provided that m +n is greater than or equal to 2.

11. The masking composition according to claim 1, wherein m+n is 3 to 10, inclusive.

12. The masking composition according to claim 10, further comprising an amount of film forming thickener effective to maintain said masking composition as a sag-resistant, overspray-resistant continuous film and selected from the group consisting of: hydroxyethylcellulose, hydroxypropylcellulose, hydroxypropylmethyl cellulose, sodium carboxymethyl cellulose, glyactomanine, guar gum, agar, algin, carrageenan, gum arabic, gum tragacanth, karaya gum, locust bean gum, pectin, microbial polysaccharides, polyvinyl alcohols, and mixtures thereof.

13. The masking composition according to claim 10, further comprising an amount of film forming thickener effective to maintain said masking composition as a sag-resistant, overspray-resistant continuous film, wherein said thickener comprises xanthan gum.

14. The masking composition according to claim 10, further comprising at least 70% by weight water therein based on total weight of said masking composition.

15. The masking composition according to claim 14, further comprising at least about 0.05% by weight of film forming thickener based on total weight of said masking composition.

16. The masking composition according to claim 14, further comprising at least at least about 0.01% by weight surfactant based on total weight of said masking composition.

17. The masking composition according to claim 14, further comprising an amount of biocide therein which is effective to inhibit microbial-induced degradation of said masking composition during storage.

18. The masking composition according to claim 10, wherein said oligomeric polyglycerol material comprises triglycerol.

19. A method of masking a painted surface, comprising: applying a masking composition to said surface, and then drying said surface at a temperature at or above room temperature, wherein said masking composition comprises an amount of an oligomeric polyglycerol material effective to retard swelling, blistering and spotting in said surface according to the formula:

$$H-[(OCH_2CHOHCH_2)_n(OCH(CH_2OH)CH_2-{}_m]-OH$$

wherein m and n are each integers between 0 and 30, inclusive, provided that m+n is greater than or equal to 2.

20. A paint spray-booth coating composition comprising an oligomeric polyglycerol material according to the formula:

$$H-[(OCH_2CHOHCH_2)_n(OCH(CH_2OH)CH_2)-{}_m]-OH$$

wherein m and n are each integers between 0 and 30, inclusive, provided that m+n is greater than or equal to 2.

21. A masking composition for application to an area of a vehicle to protect said area from paint overspray; said masking composition comprising:
(a) a water carrier;
(b) an amount of a film-forming thickener which is effective to maintain said masking composition as a sag-resistant, overspray-resistant, continuous film;
(c) an amount of surfactant effective to promote wetting and detergency of said surface and leveling of said masking composition; and
(d) at least 1% by weight based on total weight of said masking composition of a an oligomeric polyglycerol according to the formula:

$$H-[(OCH_2CHOHCH_2)_n(OCH(CH_2OH)CH_2)-{}_m]-Oh$$

wherein m and n are each integers between 0 and 30, inclusive, provided that m+n is greater than or equal to 2.

22. The masking composition according to claim 21, further comprising at least 10% by weight glycerol based on total weight of said masking composition.

23. The masking composition according to claim 21, wherein said oligomeric polyglycerol material comprises triglycerol.

24. The masking composition according to claim 11, wherein said water carrier is contained in an amount of at least about 70% by weight based on total weight masking composition.

25. The masking composition according to claim 11, wherein said water carrier is contained in an amount of about 75 to 95% by weight based on total weight of said masking composition.

26. A paint spray-booth coating composition comprising:
(a) at least 10% by weight glycerol based on total weight of said coating composition; and
(b) a polyglycerol component comprising at least 1% by weight based on total weight of said coating composition of an oligomeric polyglycerol material according to the formula:

$$H-[(OCH_2CHOHCH_2)_n(OCH(CH_2OH)CH_2)-{}_m]-OH$$

wherein m and n are each integers between 0 and 30, inclusive, provided that m+n is greater than or equal to 2.

* * * * *

UNITED STATES PATENT AND TRADEMARK OFFICE
CERTIFICATE OF CORRECTION

PATENT NO. : 5,308,647
DATED : May 3, 1994
INVENTOR(S) : Larry R. Lappi

Page 1 of 2

It is certified that error appears in the above-indentified patent and that said Letters Patent is hereby corrected as shown below:

Column 8, line 36, "*" should read -- % --.

Column 22, last line, the content of footnote 53 should read, -- Sodium dioctyl sulfosuccinate. Available from American Cyanamid Company, Wayne, New Jersey 07420. --.

Col. 23, Claim 7, line 66, "claim 11" should read -- claim 1 --.

Col. 24, Claim 9, line 28, "claim 1" should read -- claim 7 ---.

Col. 25, Claim 19, line 25, that portion of the formula reading "H-[(OCH$_2$CHOHCH$_2$)$_n$(OCH(CH$_2$OH)CH$_2$." should read -- H-[(OCH$_2$CHOHCH$_2$)$_n$(OCH(CH$_2$OH)CH$_2$) --.

UNITED STATES PATENT AND TRADEMARK OFFICE
CERTIFICATE OF CORRECTION

PATENT NO. : 5,308,647

DATED : May 3, 1994

INVENTOR(S) : Larry R. Lappi

It is certified that error appears in the above-indentified patent and that said Letters Patent is hereby corrected as shown below:

COLUMN 23, claim 5, lines 56-57 and Column 24, claim 12, lines 54-55, "glyactomanine", each occurrence, should read --galactomannan--.

COLUMN 26, claim 21, line 11, that portion of the formula reading "$_m$]-oh" should read -- $_m$]-OH --.

Signed and Sealed this

Sixth Day of September, 1994

*Attest:*

BRUCE LEHMAN

*Attesting Officer*     *Commissioner of Patents and Trademarks*